Figure 1:
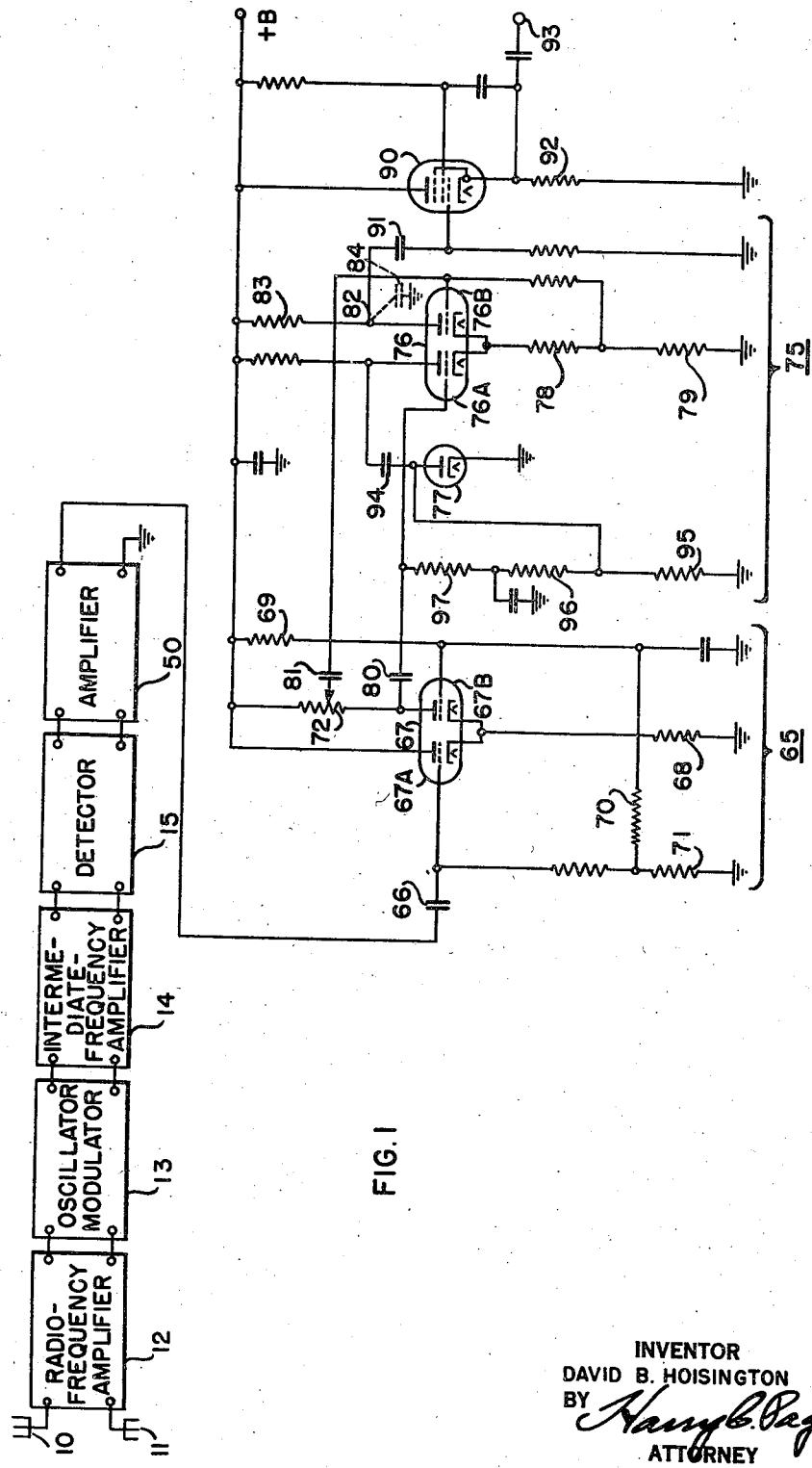

Nov. 5, 1946.	D. B. HOISINGTON	2,410,735
SIGNAL TRANSLATING SYSTEM
Filed Aug. 15, 1944	2 Sheets-Sheet 2
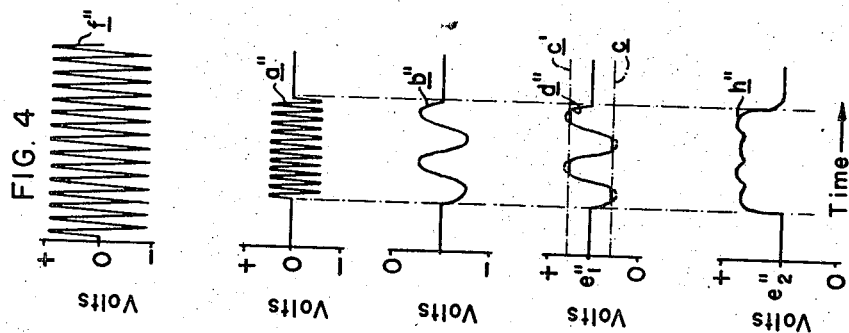
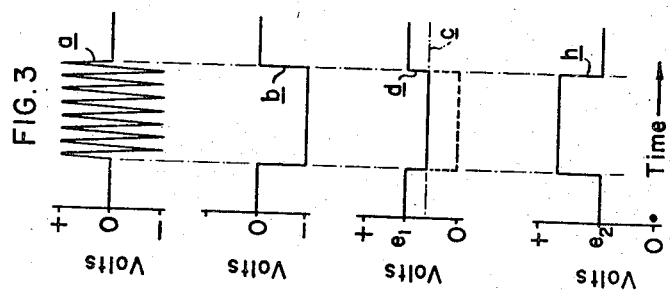
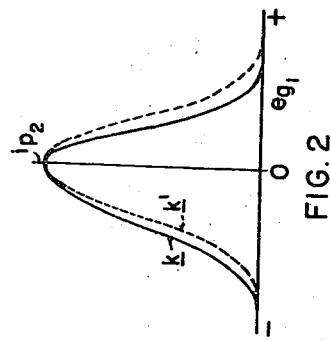
INVENTOR
DAVID B. HOISINGTON
BY
ATTORNEY Patented Nov. 5, 1946

2,410,735

UNITED STATES PATENT OFFICE 2,410,735

SIGNAL-TRANSLATING SYSTEM

David B. Hoisington, Little Neck, N. Y., assignor, by mesne assignments, to Hazeltine Research, Inc., Chicago, Ill., a corporation of Illinois Application August 15, 1944, Serial No. 549,615

11 Claims. (Cl. 250—27)

This invention relates, in general, to a signal-translating system for translating a signal which may include bidirectional amplitude variations with respect to a reference amplitude level. More specifically, the invention pertains to a system for translating such a signal to derive therefrom an output signal having amplitude variations which are determined by the variations of the applied signal but which are unidirectional with respect to a reference amplitude level corresponding to the reference level of the applied signal.

A familiar example of a signal having "bidirectional amplitude variations with respect to a reference amplitude level" is an alternating current signal which, by definition, has alternate amplitude variations of positive and negative polarity with respect to an alternating current axis, or a zero reference amplitude level. When such a signal is applied to a full-wave rectifying system, the output signal obtained therefrom has "amplitude variations which are determined by the variations of the applied alternating current signal but which are unidirectional with respect to a reference amplitude level corresponding to the reference level of the applied signal." In the usual case, the output signal likewise has a reference level of zero amplitude and its amplitude variations are either of positive or negative polarity. Thus, it will be seen that such a full-wave rectifying system constitutes a signal-translating system of the type to which the present invention is directed. However, in applying the signal to be translated to the arrangements of the prior art, a driver stage comprising a vacuum tube having a balanced output circuit is frequently employed. The balanced output circuit materially reduces the gain of the driver stage which, for many installations, may be an undesirable operating limitation.

While the invention is subject to a variety of applications, it is especially suited for use in a pulse-modulated wave-signal receiver of the type disclosed in applicant's copending application Serial No. 549,616, filed concurrently herewith, and will be particularly described in that connection. The copending application is assigned to the same assignee as the present invention.

It is an object of the invention to provide an improved signal-translating system which substantially avoids the above-mentioned limitation of prior art arrangements.

It is another object of the invention to provide an improved signal-translating system for translating a signal which may include bidirectional amplitude variations with respect to a reference amplitude level.

It is a specific object of the invention to provide an improved signal-translating system for translating a signal which may include bidirectional amplitude variations with respect to a reference amplitude level to derive therefrom a signal having amplitude variations which are determined by the variations of the applied signal but which are unidirectional with respect to a reference amplitude level corresponding to the reference level of the applied signal.

In accordance with the invention, a signal-translating system for translating a signal which may include bidirectional amplitude variations with respect to a reference amplitude level comprises a first repeater device. This first device is responsive to amplitude variations of the applied signal in a given direction from its reference level and is substantially less responsive to amplitude variations of the applied signal in the opposite direction from the reference level. The system also comprises a second repeater device responsive to bidirectional amplitude variations of the applied signal from its reference level. Input and output circuits are provided for the repeater devices, including an impedance common to the output circuit of the first device and to the input circuit of the second device so that signal variations in the first device tend to effect opposing signal variations in the second device. The system includes means for applying the signal with a given phase and intensity to the input circuit of the first device and means for applying the signal with the same phase but with substantially less than the aforesaid given intensity to the input circuit of the second device. Additionally, the system has means, coupled to the output circuit of the second device, for deriving an output signal from the system having amplitude variations which are determined by the variations of the applied signal but which are unidirectional with respect to a reference amplitude level corresponding to the reference level of the applied signal.

For a better understanding of the present invention, together with other and further objects thereof, reference is had to the following description taken in connection with the accompanying drawings, and its scope will be pointed out in the appended claims.

Referring to the drawings, Fig. 1 is a schematic representation of a pulse-modulated signal receiver embodying the present invention; Fig. 2 comprises curves representing an operating characteristic of a signal-translating system in accordance with the invention; while Figs. 3 and 4 individually comprise graphs utilized in explaining the operation of the Fig. 1 arrangement under different operating conditions.

Referring now more particularly to Fig. 1 of the drawings, the pulse-modulated wave-signal receiver there represented is substantially identical to that of Fig. 1 of the above-identified copending application and corresponding components thereof are designated by the same reference numerals. The representations differ in that the instant Fig. 1 discloses the schematic circuit diagram of only that portion of the receiver arrangement necessary to a complete understanding of the present invention, the remainder of the representation being in the form of a block diagram.

The arrangement of Fig. 1 may be considered as constituting the receiver portion of a direction-finder system in which direction finding information is translated by way of pulse-modulated carrier-frequency wave signals. Accordingly, the receiver is adapted to derive desired modulation components of a received pulse-modulated carrier-frequency wave signal for application to a utilizing device but is also subject to receive concurrently therewith an interfering wave signal of different frequency than the carrier frequency of the received pulse-modulated signal. As illustrated, the receiver comprises an antenna system 10, 11 for intercepting pulse-modulated carrier-frequency wave signals and for applying such signals to a first signal-translating means coupled to the antenna system.

The first signal-translating means comprises a radio-frequency amplifier 12 of one or more stages to which are coupled, in cascade, an oscillator modulator 13, an intermediate-frequency amplifier 14 of one or more stages, and a detector 15. The selector circuits included in the several components of the described signal-translating means are such as efficiently to translate both the received pulse-modulated direction-finder wave signal and an interfering continuous-wave signal to the input circuit of detector 15. The detector 15 of the described signal-translating means comprises means effective in the absence of an interfering wave signal to derive the desired modulation components of a received pulse-modulated wave signal and effective in the presence of an interfering wave signal of high intensity to derive from the received signals a heterodyne-component pulse-modulated signal having modulation components corresponding to the desired components of the received pulse-modulated signal.

The receiver also comprises a second signal-translating means coupled to detector 15 and including selector circuits for translating efficiently the desired modulation components as well as the heterodyne-component pulse-modulated signal derived in the output circuit of the detector under various operating conditions. This second signal-translating means includes an amplifier 50, having an input circuit coupled to the output circuit of detector 15 and having an output circuit which is coupled through a condenser 66 to a limiter 65.

Limiter 65 includes a duo-triode 67 having a first section 67A and a second section 67B which are cathode-coupled through a common cathode resistor 68. The anode electrodes of each section of tube 67 connect with a source of space current, indicated +B, and a bleeder network of resistors 69, 70 and 71 establishes positive potentials on the control electrodes of each section. Resistors 68–71, inclusive, are proportioned to establish such operating biases on the control electrodes of the sections of tube 67 that applied strong signal variations of negative polarity are limited by way of anode current cutoff in section 67A, while applied strong signal variations of positive polarity are similarly limited in section 67B. The output circuit of section 67B is coupled to the input circuit of a rectifying means 75, described more particularly hereinafter. Rectifier 75 is included in the second signal-translating means to derive the desired modulation components from the heterodyne-component pulse-modulated signal obtained from detector 15 in the presence of a received pulse-modulated signal and a strong interfering continuous-wave signal of different frequency than the carrier frequency of the pulse-modulated signal.

The receiver of Fig. 1 further includes means, coupled to the signal-translating means comprised of units 50, 65 and 75, for supplying the desired modulation components to a utilizing device. This means is provided by a cathode follower, including a pentode-type tube 90, coupled to the output circuit of rectifying means 75 through a coupling condenser 91. The desired modulation components of the received pulse-modulated signal are derived across a cathode impedance 92 of the cathode follower and are supplied to an output terminal 93 to which a suitable utilizing device (not shown) may be connected. The input circuit of cathode follower 90 is such as to translate only the desired modulation components to output terminal 93.

The description of the receiver to this point has been brief in view of the complete disclosure to be found in applicant's copending application.

Returning now to the consideration of unit 75, embodying the present invention, this unit comprises a signal-translating system for translating a signal which may include bidirectional amplitude variations with respect to a reference amplitude level. The system is provided by a pair of electron-discharge repeater devices, illustrated as discrete sections of a duo-triode 76, individually having anode, cathode and control electrodes.

An input circuit is coupled to the cathode and control electrodes of each device and an output circuit is coupled to the anode and cathode electrodes of each device. These circuits include a cathode impedance, series-connected resistors 78 and 79, which is common to the output circuit of the first device 76A and to the input circuit of the second device 76B so that signal variations in the first device tend to effect opposing signal variations in the second device. For the particular repeater circuit illustrated, the cathode impedance will be seen to be common to both the input and output circuits of each repeater.

The first repeater device 76A is controlled through a biasing circuit to be responsive to amplitude variations of an applied signal in a given direction from a reference amplitude level and to be substantially less responsive, but preferably unresponsive, to amplitude variations of the applied signal in the opposite direction from its reference level. The biasing circuit includes a stabilizing diode 77 coupled to the output circuit of device 76A through a coupling condenser 94 and having a load resistor 95. The diode circuit peak-rectifies the signal output of device 76A, establishing across resistor 95 a potential of negative polarity which is applied through resistors 96 and 97 to the control electrode of section 76A. The circuit is so arranged that the net bias applied to the device, including that developed by the diode 77 and that produced by cathode resistors 78 and 79, is such as to stabilize the signal input to section 76A at a level which operates section 76A substantially at anode current cutoff for a signal input having an amplitude level corresponding to the above-mentioned reference level. With this arrangement device 76A is effective to repeat substantially only to amplitude variations of positive polarity with respect to the aforementioned reference level of an applied signal.

The second repeater device 76B is responsive to bidirectional amplitude variations, or variations of positive and negative polarity, of the applied signal with respect to the reference amplitude level. This is accomplished by applying a bias potential developed across resistor 78 between the cathode and control electrodes of this device of such magnitude that the device is operated substantially above anode current cutoff.

The system further includes means, comprising a condenser 80, for applying the signal output of section 67B of limiter 65 with a given phase and given intensity to the input circuit of first repeater device 76A. Likewise, the system has means for applying the same signal output of limiter 65 with like phase but with substantially less than the aforesaid given intensity to the input circuit of the second repeater device 76B. This means is provided by a coupling condenser 81 arranged in circuit with an adjustable tap on the anode resistor 72 of limiter section 67B. Preferably, the tap is so adjusted that the output signal of the limiter as applied to the second repeater 76B has less than half the intensity of the signal as applied to the first repeater 76A.

Finally, the signal-translating system includes means, a connection 82 to the anode electrode of second repeater 76B, for deriving an output signal from the system having amplitude variations which are determined by the variations of the applied signal but which are unidirectional with respect to a reference amplitude level corresponding to, but not necessarily identical with, the reference level of the applied signal.

Before discussing the operation of the described Fig. 1 arrangement, reference is made to the characteristic curves of Fig. 2 which illustrate the variations in plate current $i_{p_2}$ of second repeater device 76B with variations in signal voltage $e_{g_1}$ applied to the control electrode of first repeater device 76A. The curves take into consideration the fact that the same signal variations that are applied to section 76A, but of less than half the signal intensity, are simultaneously applied to the control electrode of device 76B. It will be seen that the characteristic shown in full-line curve $k$ is unsymmetrical with reference to the ordinate axis $0$—$i_{p_2}$. In view of the described adjustments of unit 75, a discrimination results in favor of positive-polarity amplitude variations of the applied signal, as will appear more clearly in the ensuing discussion of the operation of the receiver.

In considering the operation of the receiver arrangement as a whole, reference is made to the series of graphs of Fig. 3, indicating the receiver response for the condition in which a pulse-modulated direction-finder wave signal alone is intercepted by antenna system 10, 11. Curve $a$ represents one pulse of the received signal. This signal, after translation in units 12–14, inclusive, is applied to detector 15 where the desired modulation components thereof are derived. The output signal of the detector, curve $b$, after amplification in amplifier 50 is limited in unit 65 at a level indicated by horizontal line $c$. Hence, as derived in the output circuit of the limiter, the detected modulation components have the wave form of full-line curve $d$. It will be seen that the translated signal appears in the output circuit of limiter 65 as a unidirectional signal having only amplitude variations of negative polarity from a reference amplitude level $e_1$.

This signal is applied with a given phase and full intensity to the input circuit of first repeater device 76A. Since this device is stabilized to operate at substantially anode current cutoff, it is unresponsive to negative-polarity amplitude variations of an applied signal and hence does not respond to the applied signal from limiter 65. However, this signal output of the limiter is simultaneously applied with the same phase but less than half intensity to the input circuit of second repeater device 76B. This device, being responsive to amplitude variations of an applied signal of either positive or negative polarity, functions in a manner analogous to a conventional amplifier and translates the applied signal to its output circuit. Cathode resistors 78 and 79 produce a substantial degenerative effect during this amplification, reducing the gain of repeater device 76A for applied amplitude variations of negative polarity. There results in the output circuit of unit 75 a signal having the wave form of curve $h$. This signal has unidirectional amplitude variations determined by the amplitude variations of the applied signal but of a positive polarity with respect to a reference amplitude level $e_2$ corresponding to the reference level $e_1$ of the applied signal. It is this signal output of curve $h$, representing the desired modulation components of the received pulse-modulated direction-finder signal, which is applied by way of cathode follower 90 to output terminal 93 of the receiver for utilization.

Referring now to the curves of Fig. 4, the operation of the receiver will be considered for the condition in which the pulse-modulated direction-finder signal of curve $a''$ is received concurrently with the interfering wave signal of curve $f''$ having a high intensity with reference to, and a different carrier frequency than, the pulse-modulated signal. For this condition, the output signal of detector 15, represented by curve $b''$, comprises a heterodyne-component pulse-modulated signal having modulation components corresponding to the desired components of the received pulse-modulated signal and having a frequency equal to the difference between the carrier frequencies of both received signals. A more complete discussion of the signal produced in the circuit of detector 15 for the assumed operating conditions is included in the above-mentioned copending application. Due to the capacitive coupling between the stages following detector 15, this signal is applied to limiter 65 as a pure alternating current signal and there its positive and negative amplitude variations are limited at the limiting levels indicated by the horizontal lines $c'$ and $c$, respectively, of Fig. 4. The resulting signal output of the limiter is represented by full-line curve $d''$. This signal is applied to rectifier 75 and will be seen to have bidirectional amplitude variations from a reference amplitude level $e_1''$ corresponding to the alternating current axis of the heterodyne-component pulse-modulated signal.

The negative-polarity amplitude variations of the limited heterodyne-component signal are applied with a given phase and full intensity to first repeater device 76A and are applied with the same phase but with less than half intensity to second repeater device 76B. Such negative-polarity amplitude variations of the applied signal are translated only by repeater device 76B, appearing in the output circuit of rectifier 75 with positive polarity in the manner already described.

The positive-polarity amplitude variations of the limited heterodyne-component signal are applied with the same relative phase and intensity to repeaters 76A and 76B as the negative-polarity amplitude variations. The translation of such positive amplitude variations of the applied signal may be most readily understood from the following consideration of the loading effect produced by repeater 76B on the operation of repeater 76A.

Consider, first, a condition in which no signal is applied to the input circuit of repeater 76B while a positive signal variation is applied to the input circuit of repeater 76A. Under such conditions, repeater 76B effectively comprises a load on the cathode circuit of repeater 76A so that a signal variation of positive polarity and of approximately one-half the magnitude of the applied signal is established across the common cathode impedance 78, 79. If the same positive signal variation is simultaneously applied to the input circuits of both repeaters 76A and 76B, the repeaters operate in parallel and establish a signal variation of positive polarity across their common cathode impedance 78, 79 which is substantially equal to that of the applied signal variation. For the intermediate condition in which a positive signal variation of a given intensity is applied to the input circuit of repeater 76A while a positive signal variation of less than half the aforementioned given intensity is appled to the input circuit of repeater 76B, the latter contributes a loading effect on the cathode of repeater 76A which is intermediate the first two described conditions. In particular, the loading effect for this intermediate condition is such that a signal variation of positive polarity is established across cathode impedance 78, 79 of a value between one-half and the full intensity of the signal variation applied to repeater 76A.

It will be evident that the operation of rectifier 75 in response to the positive-polarity amplitude variations of the limited heterodyne-component signal corresponds to the above-described intermediate loading conditions. That is to say, in response to such amplitude variations, a signal variation of positive polarity having a value between one-half and full intensity is established across cathode impedance 78, 79. This signal variation tends to cause repeater device 76B to function as a cathode-driven amplifier. However, the same signal variation but of less than half intensity which is applied through condenser 81 directly to the control electrode of repeater 76B tends to cause this repeater to function as a normal grid-driven amplifier. Since the driving voltage in the cathode circuit is the greater, the overall effect is that repeater 76B functions, for the translation of positive amplitude variations of the limited signal, as a cathode-driven amplifier. The effective driving voltage is of positive polarity and has an intensity less than half the intensity of the signal variation as applied to the input circuit of repeater 76A. In accordance with the conventional operation of a cathode-driven amplifier, the positive amplitude variations of the limited heterodyne-component signal appear in the output circuit of repeater 76B with positive polarity.

During such operating intervals when repeater device 76B functions as a cathode-driven amplifier, repeater 76A is also in a conductive state, serving as the driver stage for repeater 76B. Consequently, the impedance in the cathode circuit of repeater 76B is less than for the condition when repeater 76A is nonconductive, as during the translation of applied signal variations of negative polarity. Therefore, there is less degeneration in the circuit of repeater 76B during the translation of signal variations of positive polarity than otherwise and consequently the positive-polarity amplitude variations of the limited heterodyne-component signal are translated with higher gain than corresponding amplitude variations of negative polarity.

Thus the output signal of the rectifier 75 in response to the limited signal of curve $d''$ has the wave form of curve $h''$. This signal will be seen to have amplitude variations determined by, and having a predetermined ratio to, the positive-polarity amplitude variations of the heterodyne-component signal of curve $d''$ as well as amplitude variations determined by, but having a lesser ratio to, the negative-polarity amplitude variations of the heterodyne-component signal. Also, the amplitude variations of the resulting output signal of curve $h''$ are unidirectional with respect to a reference amplitude level $e_2''$, corresponding to the reference level $e_1''$ or alternating current axis of the applied heterodyne-component signal. This output signal comprises the desired modulation components of the received pulse-modulated direction-finder signal and is translated through cathode follower 90 to output terminal 93 of the receiver.

In discussing the operation of unit 75 mention has been made of the "reference amplitude level" of the derived output signal, this level being described as "corresponding to the reference amplitude level of the applied signal." The first quoted expression is intended to mean that amplitude level of the output signal which corresponds to the reference amplitude level of the input signal after the signal has been translated through stage 75.

It will be evident from a comparison of curves $d''$ and $h''$ of Fig. 4 that unit 75 effectively comprises a full-wave rectifier. In one embodiment of the invention found to have practical utility, the circuit components of the rectifying system were as follows:

| | |
|---|---|
| Tube 76 | Type 6SL7GT |
| Tube 77 | One section of a type 6H6 duo-diode |
| Resistors 78 and 79 | 1200 ohms |
| Resistor 83 | 22,000 ohms |
| Resistors 95 and 96 | 220,000 ohms |
| Resistor 97 | 4.7 megohms |
| Condensers 80 and 81 | 1,000 micromicrofarads |
| Condenser 94 | 0.01 microfarad |

The rectifier arrangement may be adjusted, if desired, so that amplitude variations of positive and negative polarity of an applied signal are translated with the same degree of amplification instead of with the described discrimination in favor of positive-amplitude signal variations. This alternate operating condition may be realized through an appropriate adjustment of the tap on resistor 72 to increase the level of the signals applied to repeater 76B. When such an adjustment has been made the overall signal-translating characteristic of unit 75 may be represented by curve $k'$ of Fig. 2. Curve $k'$ is symmetrical with respect to the ordinate axis $0-i_{p_2}$. Additionally, further adjustment of the tap on resistor 72 may result in a discrimination in favor of amplitude variations of negative polarity.

In any case, the relative magnitudes of the plate resistance $r_p$ of repeater 76B and its anode resistor 83 have a pronounced effect on the response of the rectifier system to applied signal variations of positive and negative polarity. This may best be illustrated by means of an example. Assume that it is desired to have equal gain for applied signal variations of positive and negative polarity. If the anode load resistor 83 is very large in comparison with the anode resistance of the repeater, the desired translating characteristic is obtained when the signal is applied to repeater 76B with approximately one-half the intensity of the signal as applied to repeater 76A. On the other hand, where the anode resistor is much less than the anode resistance of the tube the ratio of the signal voltages applied to the repeater is adjusted to approach $$\frac{1}{2\sqrt{2}}$$

While in the described embodiment of the invention the first repeater 76A is operated at anode current cutoff, it will be understood that this repeater may, if desired, be operated at a condition of anode current saturation. In such case, the first repeater is responsive substantially only to applied amplitude variations of negative polarity and the general operation of rectifier 75 is substantially as described. However, the amplitude variations of the derived output signal will be of negative polarity.

The signal-translating system of the present invention will be seen to have the advantage over prior art arrangements that its driver stage 65 has normal gain. This results from the fact that a balanced output signal is not required for the purpose of driving signal-translating system 75.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal-translating system for translating a signal which may include bidirectional amplitude variations with respect to a reference amplitude level comprising, a first repeater device responsive to amplitude variations of said signal in a given direction from said reference level and substantially less responsive to amplitude variations of said signal in the opposite direction from said reference level, a second repeater device responsive to bidirectional amplitude variations of said signal from said reference level, input and output circuits for said devices including an impedance common to the output circuit of said first device and to the input circuit of said second device so that signal variations in said first device tend to effect opposing signal variations in said second device, means for applying said signal with a given phase and intensity to said input circuit of said first device, means for applying said signal with the same phase but with substantially less than said given intensity to said input circuit of said second device, and means coupled to said output circuit of said second device for deriving an output signal from said system having amplitude variations which are determined by said variations of said applied signal but which are unidirectional with respect to a reference amplitude level corresponding to said reference level of said applied signal.

2. A signal-translating system for translating a signal which may include bidirectional amplitude variations with respect to a reference amplitude level comprising, a first repeater device responsive to amplitude variations of said signal in a given direction from said reference level and substantially unresponsive to amplitude variations of said signal in the opposite direction from said reference level, a second repeater device responsive to bidirectional amplitude variations of said signal from said reference level, input and output circuits for said devices including an impedance common to the output circuit of said first device and to the input circuit of said second device so that signal variations in said first device tend to effect opposing signal variations in said second device, means for applying said signal with a given phase and intensity to said input circuit of said first device, means for applying said signal with the same phase but with substantially less than said given intensity to said input circuit of said second device, and means coupled to said output circuit of said second device for deriving an output signal from said system having amplitude variations which are determined by said variations of said applied signal but which are unidirectional with respect to a reference amplitude level corresponding to said reference level of said applied signal.

3. A signal-translating system for translating a signal which may include bidirectional amplitude variations with respect to a reference amplitude level comprising, a first repeater device responsive to amplitude variations of said signal in a given direction from said reference level and substantially less responsive to amplitude variations of said signal in the opposite direction from said reference level, a second repeater device responsive to bidirectional amplitude variations of said signal from said reference level, input and output circuits for said devices including an impedance common to the output circuit of said first device and to the input circuit of said second device so that signal variations in said first device tend to effect opposing signal variations in said second device, means for applying said signal with a given phase and intensity to said input circuit of said first device, means for applying said signal with the same phase but with approximately half of said given intensity to said input circuit of said second device, and means coupled to said output circuit of said second device for deriving an output signal from said system having amplitude variations which are determined by and proportional to said variations of said applied signal but which are unidirectional with respect to a reference amplitude level corresponding to said reference level of said applied signal.

4. A signal-translating system for translating a signal which may include bidirectional amplitude variations with respect to a reference amplitude level comprising, a first repeater device responsive to amplitude variations of said signal in a given direction from said reference level and substantially less responsive to amplitude variations of said signal in the opposite direction from said reference level, a second repeater device responsive to bidirectional amplitude variations of said signal from said reference level, input and output circuits for said devices including an impedance common to the output circuit of said first device and to the input circuit of said second device so that signal variations in said first device tend to effect opposing signal variations in said second device, means for applying said signal with a given phase and intensity to said input circuit of said first device, means for applying said signal with the same phase but with less than half of said given intensity to said input circuit of said second device, and means coupled to said output circuit of said second device for deriving an output signal from said system having amplitude variations determined by and having a predetermined ratio to said variations in said given direction of said applied signal and having amplitude variations determined by and having a lesser ratio to said variations in said opposite direction of said applied signal, said amplitude variations of said output signal being unidirectional with respect to a reference amplitude level corresponding to said reference level of said applied signal.

5. A signal-translating system for translating a signal which may include bidirectional amplitude variations with respect to a reference amplitude level comprising, a first repeater device responsive to amplitude variations of said signal in a given direction from said reference level and substantially less responsive to amplitude variations of said signal in the opposite direction from said reference level, a second repeater device responsive to bidirectional amplitude variations of said signal from said reference level, input and output circuits for said devices including an impedance common to the input and output circuits of each of said devices so that signal variations in said first device tend to effect opposing signal variations in said second device, means for applying said signal with a given phase and intensity to said input circuit of said first device, means for applying said signal with the same phase but with substantially less than said given intensity to said input circuit of said second device, and means coupled to said output circuit of said second device for deriving an output signal from said system having amplitude variations which are determined by said variations of said applied signal but which are unidirectional with respect to a reference amplitude level corresponding to said reference level of said applied signal.

6. A signal-translating system for translating a signal which may include bidirectional amplitude variations with respect to a reference amplitude level comprising, a first electron-discharge repeater device responsive to amplitude variations of said signal in a given direction from said reference level and substantially less responsive to amplitude variations of said signal in the opposite direction from said reference level, a second electron-discharge repeater device responsive to bidirectional amplitude variations of said signal from said reference level, input and output circuits for said devices including an impedance common to the output circuit of said first device and to the input circuit of said second device so that signal variations in said first device tend to effect opposing signal variations in said second device, means for applying said signal with a given phase and intensity to said input circuit of said first device, means for applying said signal with the same phase but with substantially less than said given intensity to said input circuit of said second device, and means coupled to said output circuit of said second device for deriving an output signal from said system having amplitude variations which are determined by said variations of said applied signal but which are unidirectional with respect to a reference amplitude level corresponding to said reference level of said applied signal.

7. A signal-translating system for translating a signal which may include bidirectional amplitude variations with respect to a reference amplitude level comprising, a pair of repeater devices, input and output circuits for said devices including an impedance common to the output circuit of the first of said devices and to the input circuit of the second of said devices so that signal variations in said first device tend to effect opposing signal variations in said second device, means for applying said signal with a given phase and intensity to said input circuit of said first device, means for applying said signal with the same phase but with substantially less than said given intensity to said input circuit of said second device, means for controlling said first device to be responsive to amplitude variations of said signal in a given direction from said reference level and to be substantially less responsive to amplitude variations of said signal in the opposite direction from said reference level, means for controlling said second device to be responsive to bidirectional amplitude variations of said signal from said reference level, and means coupled to said output circuit of said second device for deriving an output signal from said system having amplitude variations which are determined by said variations of said applied signal but which are unidirectional with respect to a reference amplitude level corresponding to said reference level of said applied signal.

8. A signal-translating system for translating a signal which may include bidirectional amplitude variations with respect to a reference amplitude level comprising, a pair of electron-discharge repeater devices, input and output circuits for said devices including an impedance common to the output circuit of the first of said devices and to the input circuit of the second devices so that signal variations in said first device tend to effect opposing signal variations in said second device, means for applying said signal with a given phase and intensity to said input circuit of said first device, means for applying said signal with the same phase but with substantially less than said given intensity to said input circuit of said second device, means for biasing said first device to be responsive to amplitude variations of said signal in a given direction from said reference level and to be substantially less responsive to amplitude variations of said signal in the opposite direction from said reference level, means for biasing said second device to be responsive to bidirectional amplitude variations of said signal from said reference level, and means coupled to said output circuit of said second device for deriving an output signal from said system having amplitude variations which are determined by said variations of said applied signal but which are unidirectional with respect to a reference amplitude level corresponding to said reference level of said applied signal.

9. A signal-translating system for translating a signal which may include bidirectional amplitude variations with respect to a reference amplitude level comprising, a pair of electron-discharge repeater devices, input and output circuits for said devices including an impedance common to the output circuit of the first of said devices and to the input circuit of the second of said devices so that signal variations in said first device tend to effect opposing signal variations in said second device, means for applying said signal with a given phase and intensity to said input circuit of said first device, means for applying said signal with the same phase but with substantially less than said given intensity to said input circuit of said second device, stabilizing means responsive to said signal for biasing said first device to be responsive to amplitude variations of said signal in a given direction from said reference level and to be substantially less responsive to amplitude variations of said signal in the opposite direction from said reference level, means for biasing said second device to be responsive to bidirectional amplitude variations of said signal from said reference level, and means coupled to said output circuit of said second device for deriving an output signal from said system having amplitude variations which are determined by said variations of said applied signal but which are unidirectional with respect to a reference amplitude level corresponding to said reference level of said applied signal.

10. A signal-translating system for translating a signal which may include bidirectional amplitude variations with respect to a reference amplitude level comprising, a pair of electron-discharge repeater devices individually having anode, cathode and control electrodes, input and output circuits for said devices coupled to said electrodes thereof and including a cathode impedance common to the output circuit of the first of said devices and to the input circuit of the second of said devices so that signal variations in said first device tend to effect opposing signal variations in said second device, means for applying said signal with a given phase and intensity to said input circuit of said first device, means for applying said signal with the same phase but with substantially less than said given intensity to said input circuit of said second device, means for controlling said first device to be responsive to amplitude variations of said signal in a given direction from said reference level and to be substantially less responsive to amplitude variations of said signal in the opposite direction from said reference level, means for controlling said second device to be responsive to bidirectional amplitude variations of said signal from said reference level, and means coupled to said output circuit of said second device for deriving an output signal from said system having amplitude variations which are determined by said variations of said applied signal but which are unidirectional with respect to a reference amplitude level corresponding to said reference level of said applied signal.

11. A signal-translating system for translating a signal which may include bidirectional amplitude variations with respect to a reference amplitude level comprising, a pair of electron-discharge repeater devices individually having anode, cathode and control electrodes, input and output circuits for said devices coupled to said electrodes thereof and including a cathode resistor common to the input and output circuits of each of said devices so that signal variations in the first of said devices tend to effect opposing signal variations in the second of said devices, means for applying said signal with a given phase and intensity to said input circuit of said first device, means for applying said signal with the same phase but with substantially less than said given intensity to said input circuit of said second device, means for applying a bias potential between said cathode and control electrodes of said first device such that said first device is operated substantially at anode current cutoff to be responsive substantially only to amplitude variations of said signal in a given direction from said reference level, means for applying a bias potential between said cathode and control electrodes of said second device such that said second device is operated substantially above anode current cutoff to be responsive to bidirectiional amplitude variations of said signal from said reference level, and means coupled to said anode electrode of said second device for deriving an output signal from said system having amplitude variations which are determined by said variations of said applied signal but which are unidirectional with respect to a reference amplitude level corresponding to said reference level of said applied signal.

DAVID B. HOISINGTON.